United States Patent [19]

Ohta et al.

[11] Patent Number: 4,628,458
[45] Date of Patent: Dec. 9, 1986

[54] METHOD OF DETECTING LIFT OF TOOL BASED UPON CUMULATIVE MACHINING DISTANCE

[75] Inventors: Takeshi Ohta, Nishio; Tetsuro Yamakage, Anjoh; Yoshio Sakakibara, Handa, all of Japan

[73] Assignee: Toyoda Koki Kabushiki Kaisha, Kariya, Japan

[21] Appl. No.: 621,233

[22] Filed: Jun. 15, 1984

[30] Foreign Application Priority Data

Jun. 30, 1983 [JP] Japan ................................ 58-118493

[51] Int. Cl.$^4$ ............................................ G06F 15/46
[52] U.S. Cl. ................................... 364/474; 364/170; 364/184; 318/563; 318/572; 318/632
[58] Field of Search ............... 364/474, 475, 167, 170, 364/184, 185, 571; 318/632, 563, 565, 572; 29/568

[56] References Cited

U.S. PATENT DOCUMENTS 4,214,191 7/1980 Watanabe et al. ................... 318/572
4,296,364 10/1981 Fukuyama et al. .................. 318/632
4,351,029 9/1982 Makey et al. ....................... 364/474
4,497,029 1/1985 Kiyokawa ........................... 364/170

FOREIGN PATENT DOCUMENTS

51-12792 4/1976 Japan .
51-34995 9/1976 Japan .

Primary Examiner—Jerry Smith
Assistant Examiner—John R. Lastova
Attorney, Agent, or Firm—Oblon, Fisher, Spivak, McClelland & Maier

[57] ABSTRACT

Life of a tool used in a machining center having various sorts of tools can be detected by steps that a tool selection code at every execution of NC program is detected and the current-use tool number is stored, the machining distance of each tool is calculated, the machining distance is accumulated per each tool, the cumulative machining distance is compared with predetermined machining life distance to indicate the life of each tool, and then the life of each tool is determined on the basis of a result obtained in the comparing step.

3 Claims, 9 Drawing Figures

| TOOL NUMBER | CUMULATIVE MACHINING DISTANCE | TOOL LIFE DISTANCE | SPARE TOOL NUMBER |
|---|---|---|---|
| T01 | $U_{01}$ | $L_{01}$ | T21 |
| T02 | $U_{02}$ | $L_{02}$ | T22 |
| T03 | $U_{03}$ | $L_{03}$ | T23 |
| ⋮ | ⋮ | ⋮ | ⋮ |

METHOD OF DETECTING LIFT OF TOOL BASED UPON CUMULATIVE MACHINING DISTANCE

BACKGROUND OF THE INVENTION

1. Field of the Invention

The present invention relates to method of controlling a machining center having a large number of tools of plural sorts using a computerized numerical controller (CNC), and more particularly to method of detecting life of every tool in the control system.

2. Description of the Prior Art

Cutting edge of a tool used in a machine tool is abraded as machining is performed for a long time, thereby the cutting quality is deteriorated. Abrasion of the cutting edge decreases the machining efficiency and affects adversely to the machining accuracy of surface of a work. In order to eliminate such disadvantages life of each tool must be supervised separately. In a method known as a conventional control method for tool life, time relating to cutting by a tool is integrated, and when the integrated value becomes a limit use life time which is empirically set from tool use conditions, information is performed regarding that the tool is at the limit life state. This system may be used for detecting the tool life in an exclusive machine tool in which specified tools are used exclusively and therefore sorts of the tools are limited. In a numerically controlled machining center with automatic tool change device, however, many sorts of tools are frequently changed and these are used uncontinuously. If above-mentioned method of integrating the use time by timers is applied to such machining center, the timers in number corresponding to sorts of the tools will be required. Moreover, one timer corresponding to a tool relating to machining must be selected among a plurality of timers, and the selected timer must be operated simultaneously at the start of machining and stopped simultaneously at the end thereof. Accordingly, control circuit for changing the operation becomes quite complicated and enlargement of the control apparatus results in high cost, thus the method has many problems for practicable use.

In order to eliminate these disadvantages, method of discriminating the life end of each tool is proposed. The method comprises steps of reading the tool number to be used in the machining, relative speed of machining and feed amount from the control code on numerical control program (hereinafter referred to as "NC program"), calculating time for the tool to perform the machining in a machining routine, and accumulating the machining time of every tool and comparing the cumulative value with the life time given previously to each tool. This method can be realized by software stored in a computerized numerical controller (CNC).

Any of above-mentioned control methods decides the tool life based on the cumulative machining time. However, degree of abrasion of a tool varies depending on that the cutting rate is high or low even if the same work is machined by the same tool in the same use time. That is, degree of abrasion increases as the cutting rate becomes high. Consequently, if the tool life is determined on the basis of only the tool use time, a tool in use at relatively slow cutting speed may be discriminated to come to the limit of use life although not coming thereto. On the contrary, a tool in use at high cutting speed may be used over the limit life, which causes deterioration in the cutting efficiency and the precision of cutting surface.

SUMMARY OF THE INVENTION

Consequently, a main object of the present invention is to provide method of detecting life of a tool, which can be applied to a machining center with automatic tool change device where a large number of tools are selectively used.

Another object of the invention is to provide method of detecting life of a tool, which can decide the life of each tool more accurately.

A specific object of the invention is to provide method of detecting life of a tool, wherein the life of each tool is detected on the basis of amount of movement for the tool to perform the machining actually.

According to the invention, machining distance for each tool to machine a work actually is accumulated, and the cumulative machining distance is compared with a prescribed machining distance, thereby use life of the tool is decided. Consequently, the use life of the tool can be decided more accurately and the production efficiency and finishing precision can be improved.

Figure 1:
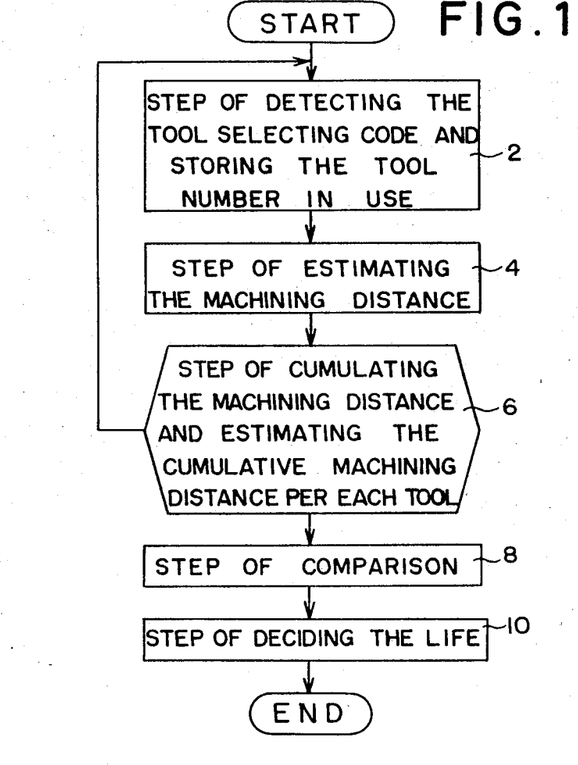
FIG. 1 is a flow chart illustrating concept of method of the invention.

FIG. 1 is a flow chart illustrating concept of the invention. A numerically controlled machining center requires NC program which records control code for controlling the machining center. The invention estimates distance for the tool to perform machining actually by utilizing such NC program and accumulates the estimated distance. At a first step, tool selecting code is detected from the NC program. When it is detected, a tool selecting sequential controller is operated and the tool number to be used actually at one machining process is stored. At a second step, when machining processing control code, e.g. cutting feed code is read regarding the tool selected by the NC program, the machining distance by the tool during one machining process is estimated whenever the machining is started. At a third step, the machining distance determined at the second step is accumulated at every tool number stored at the first step. As many works are machined by various sorts of tools, the machining distance is accumulated per each tool separately. At a fourth step, the cumulative machining distance determined at the third step is compared with a prescribed machining life distance representing the limit life of each tool. That is, since degree of use of each tool is compared with the use life distance, it is understood that what amount of the machining distance remains until coming to the prescribed limit life. At a fifth step, that what amount of the machining distance further remains is decided on the basis of the comparing result obtained in the comparing process at the fourth step, and the attaining of the limit life per each tool is decided according to the remaining machining distance. Based on the result obtained at the fifth step, the tool may be changed automatically by a new spare tool or otherwise the attaining of the limit life may be alarmed to a worker.

In the second step to determine the machining distance, it is preferable as hereinafter described in a first embodiment that relative feed rate given by the NC program and the time for the tool to perform the machining actually are measured, and on the basis of relation between the feed rate and the machining time the actual machining distance in one machining process is determined. According to such method, the machining distance per each tool can be determined from the computer program stored in the CNC using the NC program.

Also in the second step, method as described in another embodiment may be adopted. In the NC program, moving amount of each tool during the machining is given as relative distance or as absolute coordinate value. On the basis of control code representing the machining travel amount, the actual travel amount of the tool may be estimated when the tool performs the machining and is moved. In the case of linear machining, in general, the machining travel amount can be easily determined from the control data. In the case of curved machining, the curved distance can be determined from data of the radius value, the starting point, the ending point and the like contained in the program.

The present invention may be used not only in one machine tool having CNC, such as machining center, but also in so-called CNC control system where various machine tools are controlled by the main computer disposed at the center.

BRIEF DESCRIPTION OF THE DRAWINGS

FIG. 3 is a tool identification data table for storing cumulative machining distance or the like;

DETAILED DESCRIPTION OF THE PREFERRED EMBODIMENTS

Figure 2:
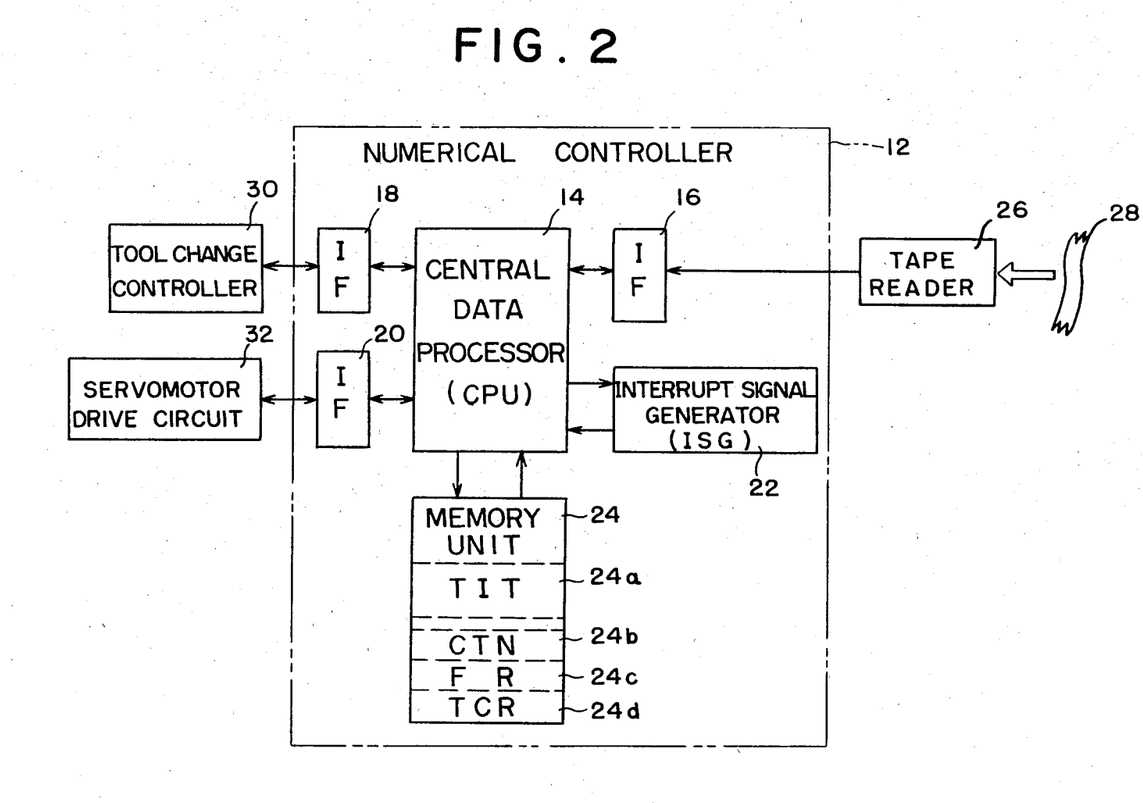
FIG. 2 is a diagram illustrating constitution of a device as an embodiment to realize the method of the invention.
Figure 3:
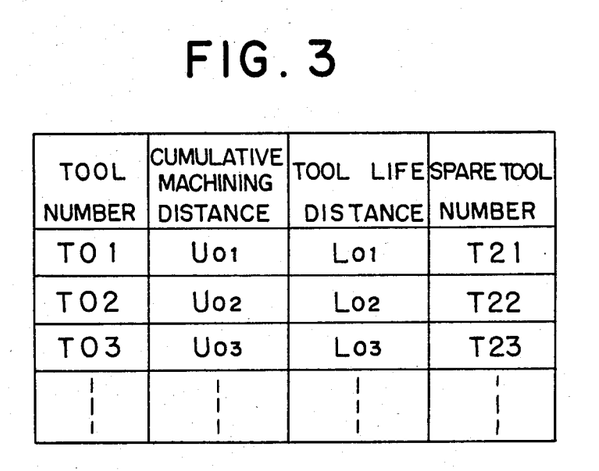

An embodiment of the invention regarding a machining center will now be described. FIG. 2 is a diagram illustrating constitution of a device to realize the detecting method by function of a computer in a numerical controller. A numerical controller 12 mainly comprises a central processing unit (CPU) 14, an input interface 16 and output interfaces 18, 20 for inputting or outputting data, an interrupt signal generator (ISG) 22 generating interrupt signals at regular intervals for time measurement, and a memory unit 24 for storing prescribed program and data. The input interface 16 of the numerical controller 12 is connected to a tape reader 26 which reads a numerical control program tape 28 with NC code punched thereon. The output interface 18 is directly connected to a tool change controller 30 which performs series of sequential control on the basis of command from the CPU 14. The output interface 20 is connected to a servomotor drive circuit 32 for controlling movement of the tool and rotation of the main shaft. On the memory unit 24 is secured memory region comprising a tool identification table TIT 24a, a current-use tool number register CTN 24b, a feed rate register FR 24c and a time calculation register TCR 24d. On the table TIT as shown in FIG. 3 are listed the tool number, tool cumulative machining distance specified by each tool number, tool life distance and spare tool number to be changed when the used tool attains the limit life. Wherein term "machining" means machining processing such as cutting or grinding performed actually by each tool. When a used tool is replaced by a new tool according to memory of cumulative machining distance or program control, the register TIT is cleared and stores numerical characters for cumulative summation of the cumulative machining distance of the tool. The register CTN temporarily stores the number of a tool being currently in use for the machining. The register FR temporarily stores data of the machining feed rate commanded by the NC program at one machining process. The register TCR is used to measure the time when the machining is actually performed at one machining process.

Figure 4:
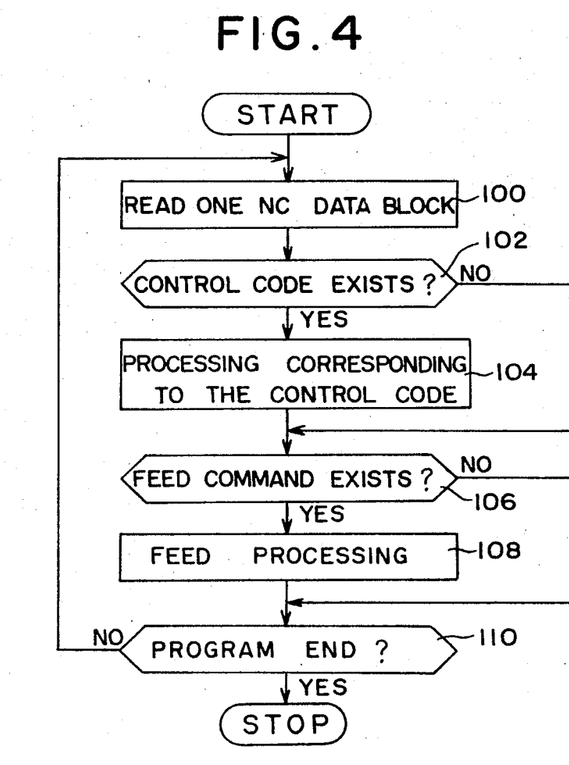
FIG. 4 is a flow chart of main program.

Flow charts illustrating software to realize method of the present invention will now be described referring to FIGS. 4–7. FIG. 4 shows main routine. In following explanation, cutting is used as one machining mode. Reading of the NC program starts at step 100 on entering the start signal of the numerical controller. At step 102, control code to control the rotation or stopping of the main shaft, such as M code other than the feed command is discriminated. If the code is not specified control code, the processing is jumped to step 106. For example, when code G00 representing rapid feed control code for the tool or code T01 representing the tool selection code is detected, the start signal is transmitted to operate each sequential controller corresponding to each of the control codes. After the processing such as tool changing is performed, processing in the computer is transferred to step 106. If the read control code is one representing the code feed command, the processing is transferred to step 108. If not, the processing is transferred to step 110 where decision is performed regarding whether or not the NC program comes to the end. If not the end, the processing is transferred to step 100.

Figure 5:
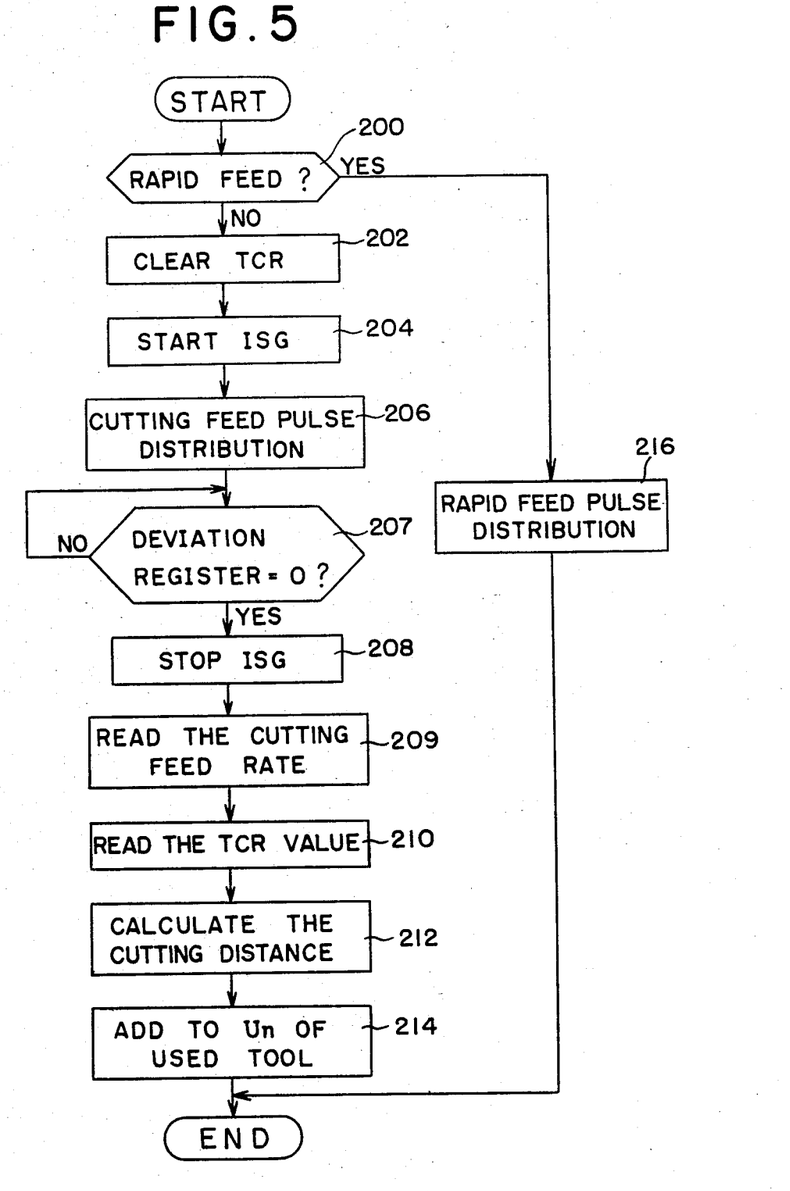
FIG. 5 is a flow chart of sub program representing feed processing.
Figure 8:
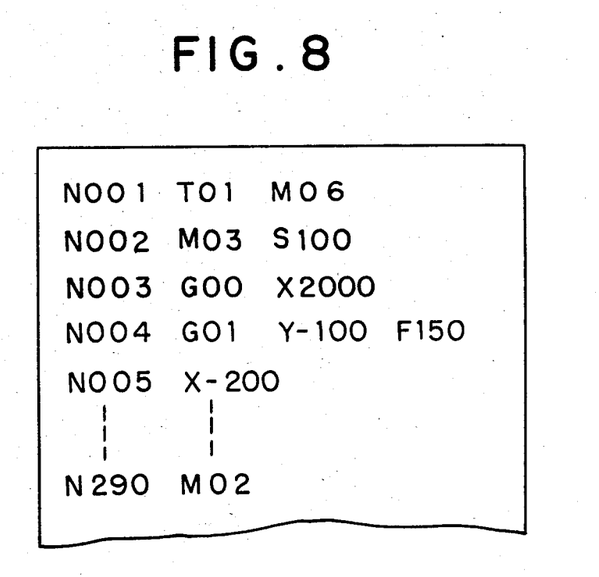
FIG. 8 is a diagram illustrating an example of NC program.

FIG. 5 illustrates feed processing shown in step 108. At step 200, decision is performed regarding whether or not the processing is rapid feed mode. If control code designated by G00 as shown in FIG. 8 is entered, the processing is transferred to step 216 where distribution processing of rapid feed pulse is performed. That is, the tool is moved to a prescribed position in non-cutting state. On the contrary, if not rapid feed mode, the processing is transferred to step 202 and since the control code in this case is cutting feed mode G01 a register TCR for measuring the cutting time is cleared. Next, the processing is transferred to step 204, where a start signal for starting an interrupt signal generator (ISG) 22 is transmitted thereto. Next, the processing is transferred to step 206, where, according to relative travel amount of the tool specified by the NC program and the tool feed rate data, numeral representing a prescribed travel amount and pulses of time rate corresponding to a prescribed feed rate are transmitted to the servomotor drive circuit 32 for driving the servomotor.

Next at step 207, decision is performed regarding whether or not a deviation register for detecting the end becomes 0. That is, state of the deviation register being 0 represents that the pulse distribution is finished and the prescribed cutting work is completed. If the deviation register is not 0, the computer is at waiting state until the decision at step 207 is repeated and becomes 0. If so, the processing is transferred to step 208. At step 208, the interrupt signal generator (ISG) 22 is stopped thereby measurement of the cutting time is stopped.

The feed rate data read from the NC program at starting the pulse distribution and stored in the FR of the memory can be read out at next step 209. Next at step 210, cutting time counted by hereinafter described interrupt routine is stored in TCR, and the stored value is read out. Next at step 212, cutting distance of the tool during one cutting process is calculated from the cutting feed rate and the cutting time. When the cutting feed rate is V and the cutting time is T, the cutting distance L is represented by L=VT. The cutting distance in this case corresponds to the above-mentioned machining distance. The tool number stored in the CTN register is identified and the stored value in prescribed position of the TIT table corresponding to the tool number is added by data of the cutting distance thereby the cumulative machining distance is newly determined and stored in the same memory region.

Figure 6:
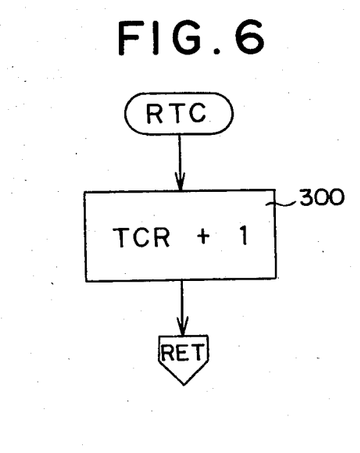
FIG. 6 is a flow chart of interrupt routine for counting the machining time.

FIG. 6 is interrupt routine for counting the cutting time. If the interrupt signal generator (ISG) 22 is started at step 204 of FIG. 5, it performs interrupt at regular intervals to the CPU. As a result, at step 300 of FIG. 6, the register TCR is incremented at every interrupt, and the number of interrupt signals is counted per prescribed time until the interrupt signals are stopped. Thus the actual cutting time is recorded in the TCR.

Figure 7:
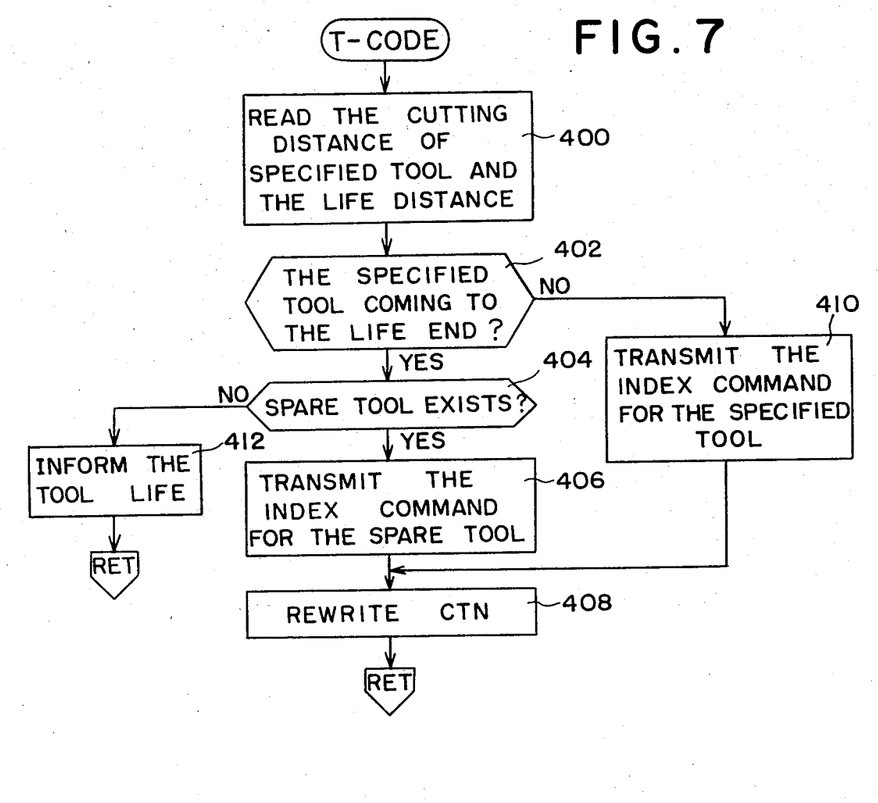
FIG. 7 is a flow chart of life decision subroutine relating to tool changing.

FIG. 7 is tool selection routine having comparison step for the tool life estimation and life decision function to execute the life decision process. If T-code of the tool selecting code is read in step 102 of the main program shown in FIG. 4, processing is transferred to step 400 of FIG. 7. At step 400, the cumulative cutting (machining) distance U and the cutting (machining) life distance L are read out from the TIT table corresponding to the selected tool number. Values of U and L are compared with each other at step 402. If U<L, decision is that the detected tool does not yet come to the life end, and at step 410 command signal to control a sequential controller for indexing the selected tool is transmitted. At step 408, the number of the indexed tool is stored in the CTN. On the contry, if U≧L at step 402, decision is that the selected tool already comes to the life end, and at next step 404 decision is performed regarding whether or not a spare tool exists. If there exists any spare tool, since the number of spare tool is stored in the TIT, command to index, the tool corresponding to the number is transmitted at step 406, and the number of spare parts stored in the CTN at step 408. If there is no spare part, processing is transferred to step 412, and coming to the life end of the tool is informed to a worker using a lamp or a buzzer.

FIG. 8 shows part of the NC program of this embodiment. Wherein T01 represents a tool selection control code, M06 a tool change code, M03 a main shaft rotation code, S100 a main shaft speed, G00 a rapid feed mode, X2000 a travel amount of feed command, G01 a cutting feed mode, Y-100 a feed command amount, i.e. relative travel amount, and F150 a feed rate.

Thus in this embodiment, the tool number to be used in cutting (machining) is stored, the cutting rate is determined from the NC program, the time required actually for the cutting is counted, the cutting distance is determined from the cutting time and the feed rate, and these values are accumulated and stored per each tool. Thereby decision of the tool life is performed at the tool changing state.

Besides the above embodiment, the life decision is not performed at the tool changing state but alarm to inform the coming of the tool life end may be outputted at the use starting of the tool. However, the above embodiment is preferable in order to change the tool automatically.

Figure 9:
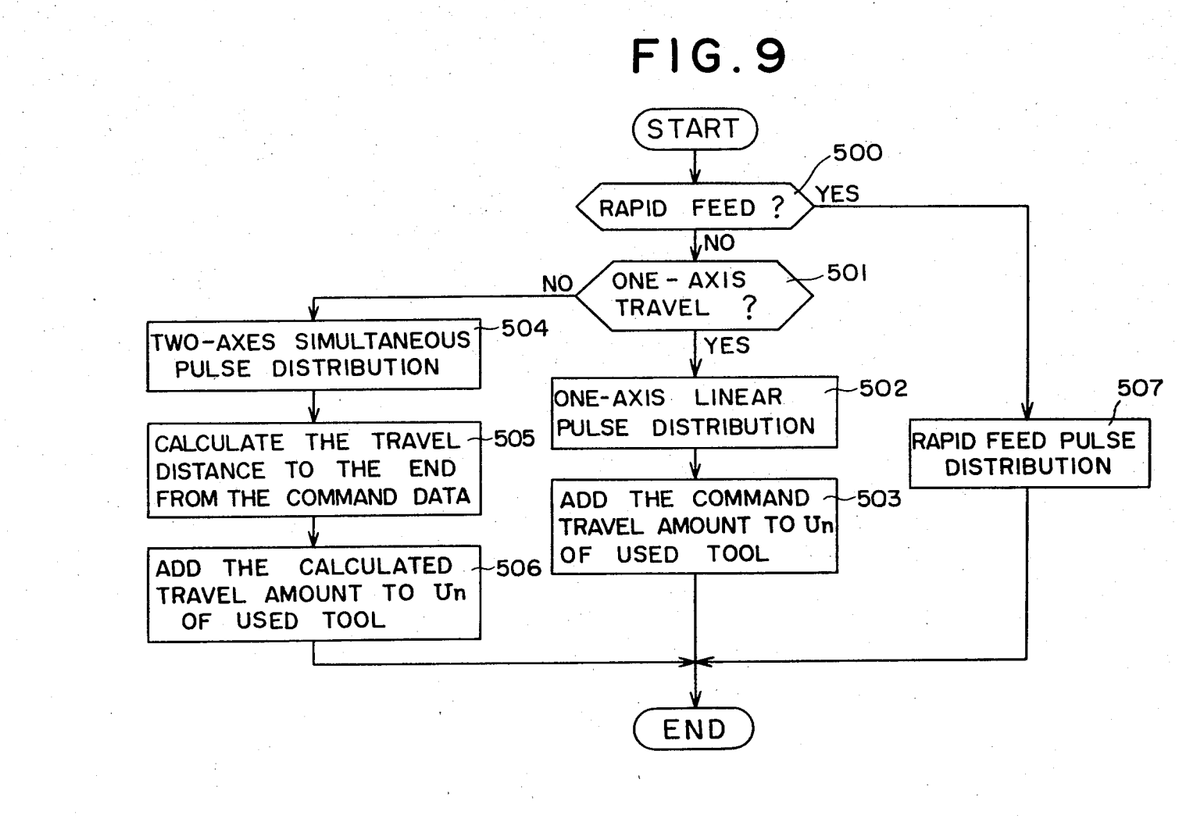
FIG. 9 is a flow chart used in a second embodiment of the invention.

FIG. 9 shows a flow chart used in a second embodiment of the invention. In the second embodiment, cutting travel distance of each tool is determined on the basis of NC program shown in FIG. 8, and the travel amount after one machining process is added to the accumulated travel distance. In the second embodiment, routine shown in FIG. 9 is executed in place of that shown in FIG. 5. An input signal generator 22 shown in FIG. 2 is unnecessary in the second embodiment, and interrupt routine shown in FIG. 6 is also unnecessary.

In the second embodiment, feed processing routine shown in FIG. 9 is executed at step 108 of FIG. 4. When cutting feed command is identified at step 500, the feed command is identified at step 501 regarding whether or not it is a contour control. If the feed command is one-shaft control, steps 502, 503 are executed and after the pulse distribution the corresponding feed command value given to the NC program is added to cumulative machining travel distance Un of the used tool. On the contrary, if the feed command is a contour control, steps 504-506 are executed. At step 505, the cutting travel distance of the tool is calculated on the basis of the end point coordinate data (Xn, Yn) specified in the NC program and G code (i.e., G01, G02, or G03). At step 506, the calculated travel distance is added to the cumulative machining distance Un of the corresponding tool.

Obviously, numerous modifications and variations are possible in light of the above teachings. It is therefore to be understood that within the scope of the appended claims, the present invention may be practiced otherwise than as specifically described herein.

What is claimed is:

1. A method of detecting the life of each of plural tools which are selectively used in accordance with a numerical control program to affect a machining operation on a workpiece in a machine tool, comprising the steps of:

detecting a tool selection code at each execution step of the NC program and storing a tool number of a tool currently in use as derived from the tool selection code;

calculating an actual machining distance for the currently in use tool during machining of the workpiece by the currently in use tool;

accumulating the actual machining distance for each tool by storing the actual machining distance determined in said calculating step for each tool and by adding thereto the actual machining distance calculated for subsequent uses of the respective tool;

comparing the accumulated actual machining distance with a predetermined machining life distance to indicate the life of each tool; and determining the life of each tool based on a result obtained in the comparing step.

2. A method of detecting the life of a tool as set forth in claim 1, wherein said step of calculating the machining distance of the tool comprises:

detecting a time period for which each tool is actually moved in a machining operation commanded by one data block of the NC program; and calculating the machining distance by multiplying the detected time period with a feed rate designated in said one data block of said NC program.

3. A method of detecting the life of each of plural tools which are selectively used in accordance with a numerical control program to affect a machining operation on a workpiece in a machine tool, comprising the steps of:

detecting a tool selection code at each execution step of the NC program and storing a tool number of a tool currently in use as derived from the tool selection code;

obtaining an actual machining distance of each tool based on feed amount data designated in one data block of the NC program, said one data block being prescribed for affecting an actual machining operation through engagement between each tool and the workpiece;

accumulating the actual machining distance for each tool by storing the actual machining distance determined in said claculating step for each tool and by adding thereto the actual machining distance calculated for subsequent uses of the respective tool;

comparing the accumulated machining distance with a predetermined machining life distance to indicate the life of each tool; and     determining the life of each tool based on a result obtained in the comparing step.

\* \* \* \* \*